(12) United States Patent
Xia et al.

(10) Patent No.: US 8,349,761 B2
(45) Date of Patent: Jan. 8, 2013

(54) DUAL-OXIDE SINTER RESISTANT CATALYST

(75) Inventors: Younan Xia, St. Louis, MO (US); Charles Taylor Campbell, Seattle, WA (US); Yunqian Dai, St. Louis, MO (US); Byungkwon Lim, St. Louis, MO (US); Benjamin Alan Grayson, Ann Arbor, MI (US); Paul T. Fanson, Brighton, MI (US)

(73) Assignees: Toyota Motor Engineering & Manufacturing North America, Inc., Erlanger, KY (US); University of Washington Center for Commercialization, Seattle, WA (US); Washington University, St. Louis, MO (US)

( * ) Notice: Subject to any disclaimer, the term of this patent is extended or adjusted under 35 U.S.C. 154(b) by 136 days.

(21) Appl. No.: 12/844,042

(22) Filed: Jul. 27, 2010

(65) Prior Publication Data

US 2012/0028793 A1 Feb. 2, 2012

(51) Int. Cl.
*B01J 23/00* (2006.01)
*B01J 21/00* (2006.01)
*B01J 37/00* (2006.01)
*B01J 35/00* (2006.01)

(52) U.S. Cl. ........ 502/240; 502/304; 502/261; 502/262; 502/263; 502/327; 502/332; 502/333; 502/334; 502/339; 502/350; 502/351; 502/352; 502/355; 502/407; 502/415; 502/439; 977/762; 977/773; 977/775

(58) Field of Classification Search .............. 502/304, 502/240, 261–263, 327, 332, 333, 334, 339, 502/350, 351, 352, 355, 407, 415, 439; 977/762, 977/773, 775

See application file for complete search history.

(56) References Cited

U.S. PATENT DOCUMENTS

| | | | |
|---|---|---|---|
| 5,017,654 A | 5/1991 | Togashi et al. | |
| 6,162,759 A | 12/2000 | Oki et al. | |
| 7,074,105 B2 * | 7/2006 | Kawate et al. | 445/51 |
| 7,569,510 B2 | 8/2009 | Deevi et al. | |
| 7,858,266 B2 * | 12/2010 | Fly et al. | 429/530 |
| 2005/0270442 A1 | 12/2005 | Yang et al. | |
| 2007/0175196 A1 * | 8/2007 | Tepper et al. | 55/527 |
| 2008/0026041 A1 * | 1/2008 | Tepper et al. | 424/445 |
| 2008/0264259 A1 * | 10/2008 | Leung | 96/143 |
| 2010/0136325 A1 * | 6/2010 | Reddy et al. | 428/329 |

(Continued)

OTHER PUBLICATIONS

Joo et al; Thermally Stable Pt/Mesoporous Silica Core-Shell Nanocatalysts for High-Temperature Reactions; Nature Materials 8; p. 1 of 2; Feb. 2009.

(Continued)

*Primary Examiner* — Cam N. Nguyen
(74) *Attorney, Agent, or Firm* — Gifford, Krass, Sprinkle, Anderson & Citkowski, P.C.

(57) ABSTRACT

A catalyst material for use at elevated temperatures is provided. The material can include a plurality of fibers and a plurality of particles supported on the fibers. In addition, a porous layer can cover the plurality of particles and allow for process fluid to come into contact with the particles, and yet retard sintering of the particles at elevated temperatures is present. The plurality of fibers can be a plurality of nanofibers which may or may not be oxide nanofibers. The particles can be metallic nanoparticles and the porous layer can be a porous oxide layer.

16 Claims, 6 Drawing Sheets

U.S. PATENT DOCUMENTS

| | | | |
|---|---|---|---|
| 2010/0166664 A1* | 7/2010 | Butts et al. | 424/9.32 |
| 2010/0173070 A1* | 7/2010 | Niu | 427/215 |
| 2010/0291473 A1* | 11/2010 | Ji et al. | 429/532 |
| 2011/0039690 A1* | 2/2011 | Niu | 502/184 |
| 2012/0077664 A1* | 3/2012 | Jangbarwala | 502/1 |

OTHER PUBLICATIONS

Zhang et al; Permeable Silica Shell through Surface-Protected Etching; American Chemical Society; Aug. 12, 2008.

* cited by examiner

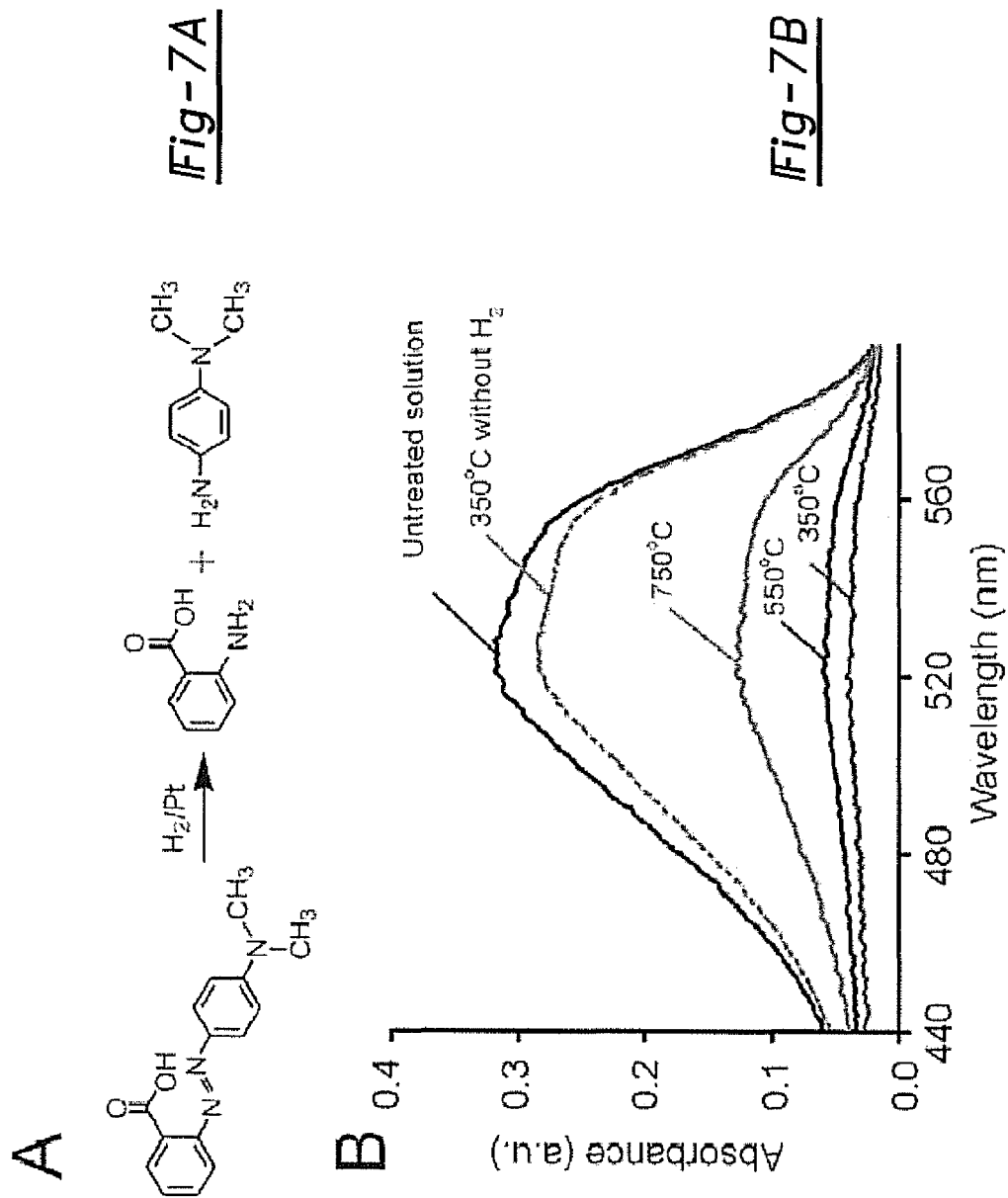

DUAL-OXIDE SINTER RESISTANT CATALYST

FIELD OF THE INVENTION

The present invention is related to a catalyst material, and in particular, to a dual-oxide sinter resistant catalyst material.

BACKGROUND OF THE INVENTION

The production of most industrially important chemicals involves the use of catalytic materials in which catalysis changes the rate of a chemical reaction. In addition, the catalytic material participates in the reaction but is not consumed in the reaction itself. Stated differently, a catalyst provides an alternative reaction path for one or more reactants becoming one or more products without being consumed in the reaction.

In some catalyst applications, expensive metals such as gold, platinum, palladium, etc., are used, and as such, a relatively small amount of the catalytic material is located on a support material and a process fluid is allowed or forced to come into contact with the catalyst material. For example, catalyst particles can be supported on fibers and a gas can be forced through the fibers, come into contact with the catalyst particles which can then assist in a desired chemical reaction.

It is also desirable to have a large surface area of the catalytic material exposed to a process gas in order to provide more reaction sites for a catalyst assisted chemical reaction. As such, nanoparticles of catalytic materials such as gold, platinum, palladium, rhodium, and the like have shown promise for use as part of a catalytic system. However, many catalytic systems are used at elevated temperatures which can result in the agglomeration or sintering of the nanoparticles. In so doing, the total surface area of the catalytic material decreases and the unique catalytic properties of nanoparticles can be lost. Therefore, a sinter resistant catalytic material would be desirable.

SUMMARY OF THE INVENTION

A dual-oxide sinter resistant catalyst material for possible use at elevated temperatures is provided. The material can include a plurality of fibers and a plurality of particles supported on the fibers. In addition, a porous layer can cover the plurality of particles. The porous layer allows for a process fluid to come into contact with the particles and yet retards sintering of the particles at elevated temperatures. The plurality of fibers can be a plurality of nanofibers which may or may not be oxide nanofibers. If the nanofibers are oxide nanofibers, the oxide can be any oxide known to those skilled in the art, illustratively including titanium oxide, aluminum oxide, cerium oxide, tin oxide, silicon oxide, and combinations thereof.

In some instances, a density of the plurality of particles supported on the fibers can be greater than $1\times10^9$ particles per square millimeter of surface area of the fibers. In addition, the plurality of particles can be nanoparticles which may or may not be metal nanoparticles that contain an element such as platinum, palladium, rhodium, gold, etc.

The porous layer can be a porous oxide layer with pores, channels, etc., that are of sufficient dimension to afford for the process fluid to flow therethrough and come into contact with the catalytic particles. If the porous layer is a porous oxide layer, the oxide can be an oxide such as silicon oxide, aluminum oxide, titanium oxide, and combinations thereof.

A process for making a sinter resistant catalyst is also provided. The process includes providing a plurality of nanofibers and providing a plurality of nanoparticles. Thereafter, the nanoparticles are supported on the plurality of nanofibers and the nanoparticles are coated with a porous layer. The porous layer may or may not also coat the nanofibers and affords for fluid to pass therethrough and come into contact with the nanoparticles.

BRIEF DESCRIPTION OF THE FIGURES

FIG. 7A is a schematic reaction for the hydrogenation of methyl red; and

FIG. 7B is a UV-vis spectra of a methyl red solution with and without undergoing a hydrogenation reaction catalyzed by a catalysts material according to an embodiment of the present invention.

DETAILED DESCRIPTION OF THE INVENTION

The present invention discloses a catalyst material that is sinter resistant. As such, the present invention has utility as a material for use in catalytic reactions.

The catalyst material can include a plurality of fibers and a plurality of particles supported on the fibers. A porous layer can be included that covers the plurality of particles, the porous layer allowing a process fluid to come in contact with the plurality of particles. The porous layer can also retard sintering of the particles at elevated temperatures. In some instances, the porous layer can also cover the supporting fibers.

In addition to the porous layer retarding sintering of the particles by providing a physical barrier thereto, the catalyst material can provide an energetic barrier to agglomeration of the particles. In some instances, the energetic barrier is afforded by the particles having a stronger attraction to a fiber and/or base oxide then to a porous oxide coating.

In some instances, the fibers are nanofibers and the particles are nanoparticles. The nanofibers can be oxide nanofibers made from oxides such as titanium oxide, aluminum oxide, cerium oxide, tin oxide, silicon oxide, combinations thereof, and the like. The plurality of particles supported on the plurality of fibers can have a density of greater than $1 \times 10^9$ particles per square millimeter of fiber surface area (particles/$mm^2$). In addition, the particles can be metal nanoparticles that contain an element such as platinum, palladium, rhodium, gold, etc.

The porous layer can be a porous oxide layer and be made from an oxide such as silicon oxide, aluminum oxide, titanium oxide, combinations thereof and the like. For the purposes of the present invention, a fiber is defined as an elongated structure having a length to diameter ratio of greater than 100. Nanofibers are defined as having same length to diameter ratio of greater than 100 and having a diameter of less than 999 nanometers. In some instances, the nanofibers can have a diameter of less than 500 nanometers, while in other instances less than 100 nanometers. Nanoparticles are defined as particles that have a mean diameter of less than 999 nanometers. In some instances, the nanoparticles can have mean diameters of less than 500 nanometers while in other instances the mean diameter can be less than 100 nanometers.

A process for making a sinter resistant catalyst is also disclosed. The process can include providing a plurality of nanofibers and providing a plurality of nanoparticles. Thereafter, the nanoparticles are supported on the plurality of nanofibers and the nanoparticles are coated with a porous layer. The porous layer may or may not also coat the nanofibers and affords for fluid to pass therethrough and come into contact with the nanoparticles.

Figure 1:
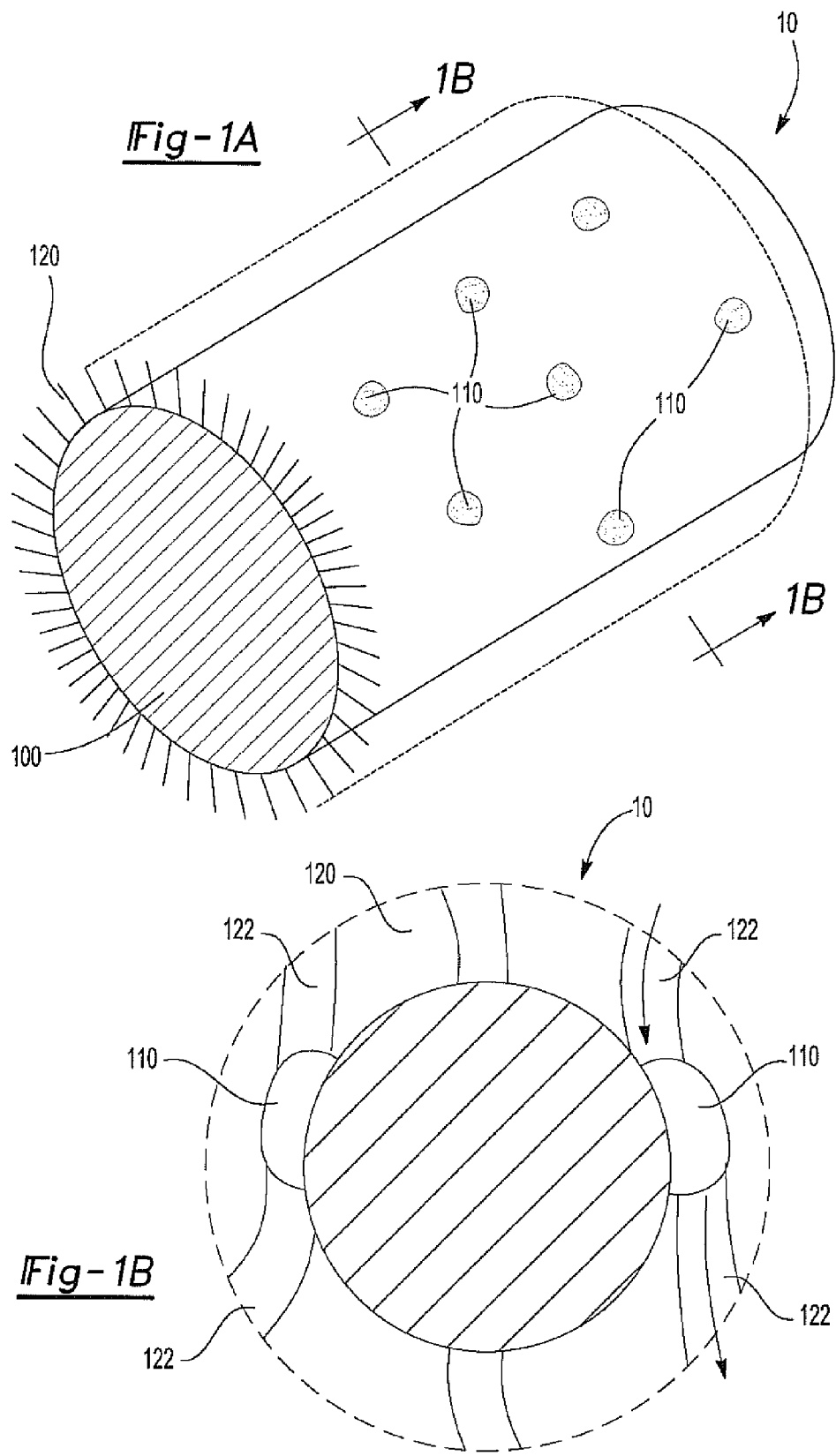
FIG. 1A is a schematic perspective view of a catalytic material according to an embodiment of the present invention.
FIG. 1B is an end cross-sectional view of section B-B shown in FIG. 1A.

Turning now to FIGS. 1A and 1B, schematic drawing of a catalyst material according to an embodiment of the present invention is shown generally at reference numeral 10. The material 10 can have a fiber 100 with a plurality of particles 110 supported thereon. In addition, a porous coating 120 can cover the particles 110, and by so doing, resist or retard sintering of the particles together when exposed to elevated temperatures. In addition, the porous coating 120 can have pores or channels 122 that afford for a product fluid to flow therethrough and come into contact with the particles 110 as shown by the arrows in FIG. 1B.

It is appreciated that the relative sizes of the fiber 100, particles 110, porous coating 120 and pores 122 are for illustrative purposes only. In addition, the porous coating 120 can have a different structure than shown in FIG. 1B so long as the particles 110 are covered and yet process fluid can come into with the particles.

In order to better illustrate and yet not limit the scope in any way, one or more examples, embodiments, experiments, and the like are provided.

Preparation and Testing of Silica/Platinum/Titania Catalyst Material

Titania nanofibers were prepared by electrospinning a solution containing 2.5 milliliters (mL) of titanium tetraisopropoxide (Sigma), 2.0 mL of acetic acid (glacial, Fisher Scientific), 0.25 grams (g) of poly(vinyl pyrrolidone) (PVP) (Mw≈$1.3 \times 10^6$, Sigma) and 5.5 mL of ethanol. The solution was loaded into a 3 mL plastic syringe with a 21 gauge stainless steel needle at the tip. The needle was electrified by a high-voltage DC supply (ES30P-5W, Gamma High Voltage Research Inc., Ormond Beach, Fla.) and a voltage of 15 kV was applied. The flow rate was 0.3 milliliters per hour (mL/h) controlled by a syringe pump (KDS-200, Stoelting, Wood Dale, Ill.). The as-spun nanofibers were kept in air overnight and then calcined in air at 750° C. for 2 h.

Platinum nanoparticles were prepared by the following process. Four (4) mL of ethylene glycol (EG) was added to a vial and heated in air at 110° C. for 30 minutes (min). PVP (22.5 mg, Mw≈55,000, Aldrich) and $H_2PtCl_6$ (16.5 mg, Aldrich) were dissolved separately in 2 mL of EG at room temperature and 0.5 mL of each solution was then added simultaneously into the 4 mL of heated EG at a rate of 0.67 mL/min. The reaction was continued with heating at 110° C. for 1.5 h and finally cooled down to room temperature. The as-prepared Pt suspension was transparent gray without any black agglomerate.

Two kinds of $Pt/TiO_2$ nanofibers were prepared with different densities of Pt nanoparticles. For a low density $Pt—TiO_2$ nanofiber (hereafter referred to as LD-$Pt/TiO_2$), 5.0 mg of $TiO_2$ nanofibers were immersed in 2.2 mL of a Pt suspension made from a mixture of 0.2 mL of the as-prepared Pt suspension (without washing) and 2 ml of ethanol, followed by a gentle stirring at room temperature for 5 h. For a high density $Pt/TiO_2$ nanofiber (hereafter referred to as HD-$Pt/TiO_2$), 6.0 mg of $TiO_2$ nanofibers were immersed in 2 mL of the as-prepared Pt suspension without any dilution and stirred for 22 h. All of the as-prepared $Pt/TiO_2$ nanofibers were washed with ethanol six times.

Porous $SiO_2$ shells on the $Pt/TiO_2$ nanofibers were prepared by dispersing 0.55 mg of the $Pt/TiO_2$ nanofibers in 10 mL of ethanol followed by the addition of 32.8 mg of cetyltrimethylammonium bromide (CTAB, Sigma), 40 µL of tetraethyl orthosilicate (TEOS, Sigma, 99.999%) and 0.15 mL of $NH_4OH$ (28% in water), which was stirred at room temperature for 4.5 h. The contents were washed with ethanol three times.

The resultant $SiO_2/Pt/TiO_2$ nanofibers were calcined in air in a box oven for 2 h at three different temperatures (350, 550, and 750° C.) to evaluate their thermal stability.

Methyl red stock solution was prepared by dissolving 3.9 mg of solid in 25 mL of ethanol, adding 50 mL of pH 4.01 buffer and then diluting to a total volume of 500 mL with water, yielding a 29 µM methyl red solution. Then, 33 µg of $SiO_2/Pt/TiO_2$ fibers were placed in a vial with 2 mL of methyl red solution bubbled with hydrogen gas for 2 min. The solution was centrifuged immediately to separate the catalyst followed by UV-vis characterization.

Figure 2:
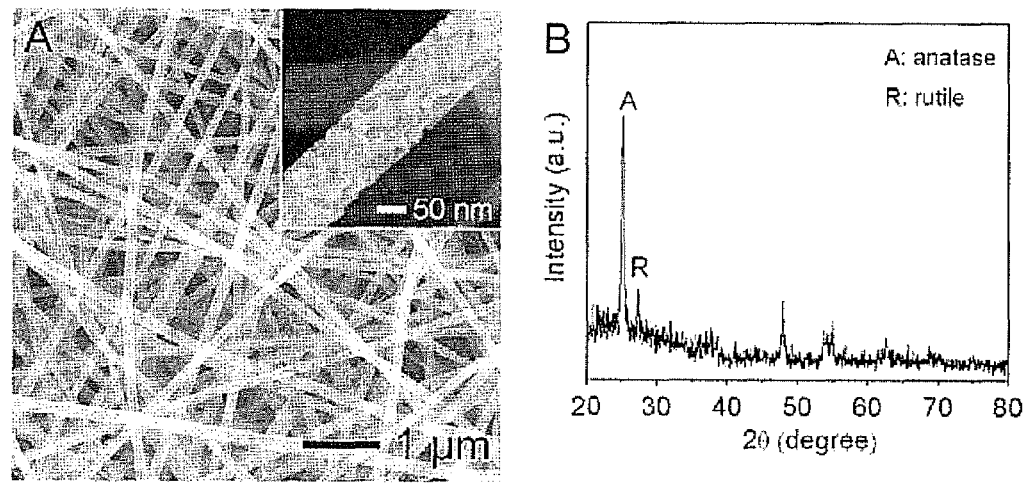
FIG. 2A is a scanning electron microscopy (SEM) image of titania nanofibers after calcination at 750° C. for 2 hours.
FIG. 2B is an x-ray diffraction (XRD) profile taken from the nanofibers shown in FIG. 2A.

Porous non-woven mats of $TiO_2$ nanofibers were prepared by the electrospinning method and calcinated in air at 750° C. for 2 h. During this process, the nanofibers become porous with a relatively rough surface and evolved into polycrystalline fibers with anatase and rutile regions having 69.48% anatase and 30.52% rutile phases. FIGS. 2A and 2B illustrate an SEM image and an x-ray diffraction (XRD) pattern of the calcinated $TiO_2$ nanofibers. It is appreciated that these properties are advantageous for uniform decoration with the Pt nanoparticles and the $SiO_2$ coating.

Figure 3:
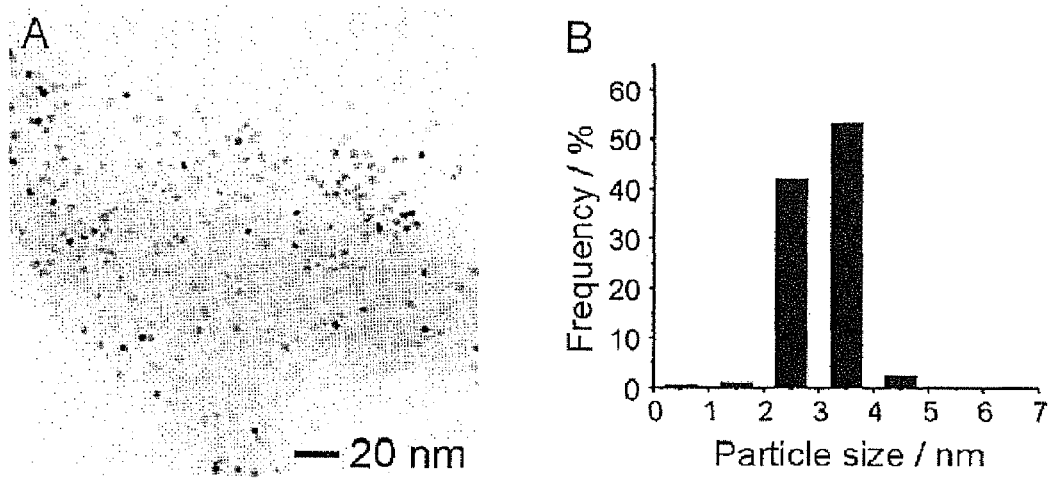
FIG. 3A is a transmission electron microscopy (TEM) image of platinum nanoparticles synthesized by a polyol method.
FIG. 3B is a graph illustrating the size distribution of the platinum nanoparticles shown in FIG. 3A.

The Pt nanoparticles were prepared by the polyol reduction method, were capped by PVP molecules and had an average size of 3.1±0.5 nanometers (nm). FIG. 3 illustrates TEM image and size distribution graph obtained by measuring 150 nanoparticles. It is appreciated that the uniform size and narrow distribution are convenient for size comparison when investigating the thermal stability of this system.

Figure 4:
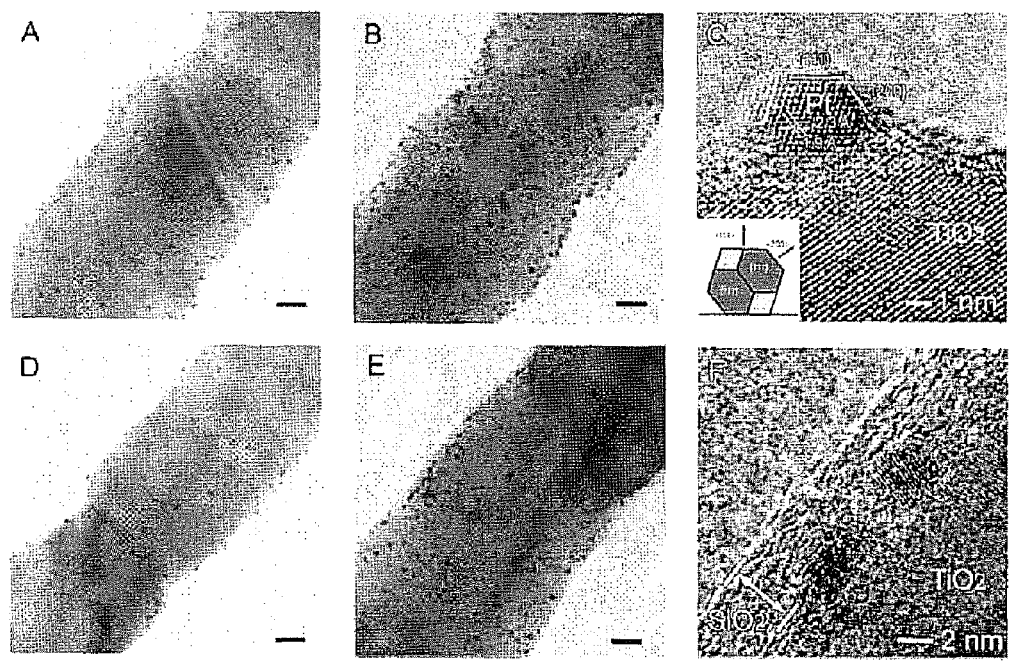
FIG. 4A is a TEM image of a low density platinum/titania nanoparticle/nanofiber according to an embodiment of the present invention.
FIG. 4B is a TEM image of a high density platinum/titania nanoparticle/nanofiber according to an embodiment of the present invention.
FIG. 4C is a high resolution TEM image of a low density platinum/titania nanoparticle/nanofiber with the inset showing a schematic model of a Pt truncated octahedron on a $TiO_2$ surface.
FIG. 4D is a TEM image of a low density platinum/titania nanoparticle/nanofiber after being coated with a porous silica layer.
FIG. 4E is a TEM image of a high density platinum/titania nanoparticle/nanofiber after being coated with a porous silica layer.
FIG. 4F is a high resolution TEM image for a low density platinum/titania nanoparticle/nanofiber after being coated with a porous silica layer.

After decoration with Pt nanoparticles, the nanofibers turn from white to light gray (LD-Pt/$TiO_2$) or gray (HD-Pt/$TiO_2$) while maintaining their non-woven morphologies. FIGS. 4A and 4B illustrate TEM images that show Pt nanoparticles well dispersed on the surface of the $TiO_2$ nanofibers instead of stacking together due to electrostatic repulsions between their negative surface charges. A density of Pt on the $TiO_2$ nanofibers was defined as the number of Pt nanoparticles per unit surface area of $TiO_2$ nanofiber. The density of LD-Pt/$TiO_2$ was $1.7\times10^9$ nanoparticles per $mm^2$ (FIG. 4A), while the loading of Pt was 1.31 wt % as calculated from ICP-MS data. This loading can be conveniently tailored by adjusting the concentration of the suspension and/or the immersion time. For example, the Pt loading of HD-Pt/$TiO_2$ increased to 3.59 wt % while the density accordingly increased to $4.8\times10^9$ nanoparticles per $mm^2$ (FIG. 4B). A high resolution TEM (HRTEM) image of a Pt nanoparticle supported on a $TiO_2$ nanofiber (see FIG. 4C) illustrated there was no significant facet or directional preference for the Pt particles deposited on the surface of the $TiO_2$ nanofiber.

Pt/$TiO_2$ nanofibers were coated with a $SiO_2$ sheath through a modified Stöber (or sol-gel) method. The cationic surfactant CTAB was introduced as a pore-generating agent during thermal treatment in the following step. The formation of amorphous $SiO_2$ coating involved base-catalyzed (ammonia solution) hydrolysis of TEOS to generate $SiO_2$ sols, which then nucleated and deposited on the surface of Pt/$TiO_2$.

TEM analysis showed that a uniform silica coating was formed on the surface of each Pt/$TiO_2$ nanofiber with a uniform thickness of 4-6 nm. TEM images of porous $SiO_2$ coated LD-Pt/$TiO_2$ (hereafter LD-$SiO_2$/Pt/$TiO_2$) and porous $SiO_2$ coated HD-Pt/$TiO_2$ (hereafter HD-$SiO_2$/Pt/$TiO_2$) are shown in FIGS. 4D and 4E, respectively. The thickness of the $SiO_2$ shell can be conveniently varied in the range of tens to several hundred nanometers by controlling the experimental conditions, such as the coating time and the concentration of catalyst or TEOS. To allow for the transport of chemical species, a thin sheath of ~5 nm in thickness was used.

Traditionally, in the coating process, amorphous $SiO_2$ can either form a sheath on the surface of a core via heterogeneous nucleation or form core-free $SiO_2$ spheres via homogeneous nucleation. In this case, the heterogeneous nucleation events dominated as individual $SiO_2$ spheres were rarely observed and the fibers were uniformly coated.

In a corresponding HRTEM image shown in FIG. 4F, it was observed that the thin shell of $SiO_2$ covered the surface of both $TiO_2$ nanofiber and the Pt nanoparticles. It is believed that the CTABs and their assembled structures facilitated the polymerization of TEOS to initiate the self-assembly of $SiO_2$ layer on the surface. Therefore, the $SiO_2$ formed a thin but complete sheath around the entire surface of each Pt nanoparticle except for the facet anchored on the $TiO_2$ fiber.

In addition to the above, the size of the Pt nanoparticle was not changed during the encapsulation process while the loading of the Pt nanoparticles slightly decreased. Since the van der Waal's force between the $TiO_2$ surface and the Pt nanoparticles is a weak interaction, it is possible for the Pt nanoparticles to be detached from the $TiO_2$ nanofiber during the coating process before the nanoparticles are encapsulated by the $SiO_2$ sheath. After stirring under the same conditions in the absence of TEOS, the Pt loading decreased to 0.82 wt %, indicating the actual Pt loading in LD-$SiO_2$/Pt/$TiO_2$ structure was in the range of 0.82 wt % to 1.31 wt % and the density was in the range of $1.0\times10^9$ to $1.7\times10^9$ nanoparticles per $mm^2$. Similarly, the Pt loading in HD-$SiO_2$/Pt/$TiO_2$ decreased from 3.59 wt % to 1.90 wt % while the density was in the range of $2.5\times10^9$ to $4.8\times10^9$ nanoparticles per $mm^2$.

The as-prepared $SiO_2$/Pt/$TiO_2$ system can contain a certain amount of carbon residue from CTAB in the $SiO_2$ coating and PVP on the Pt nanoparticles which can be undesirable for catalytic reactions. However, with a calcination temperature of 350° C., such organic molecules can be removed via combustion (PVP at 300° C. while CTAB at 350° C.), yielding a porous $SiO_2$ coating.

Figure 5:
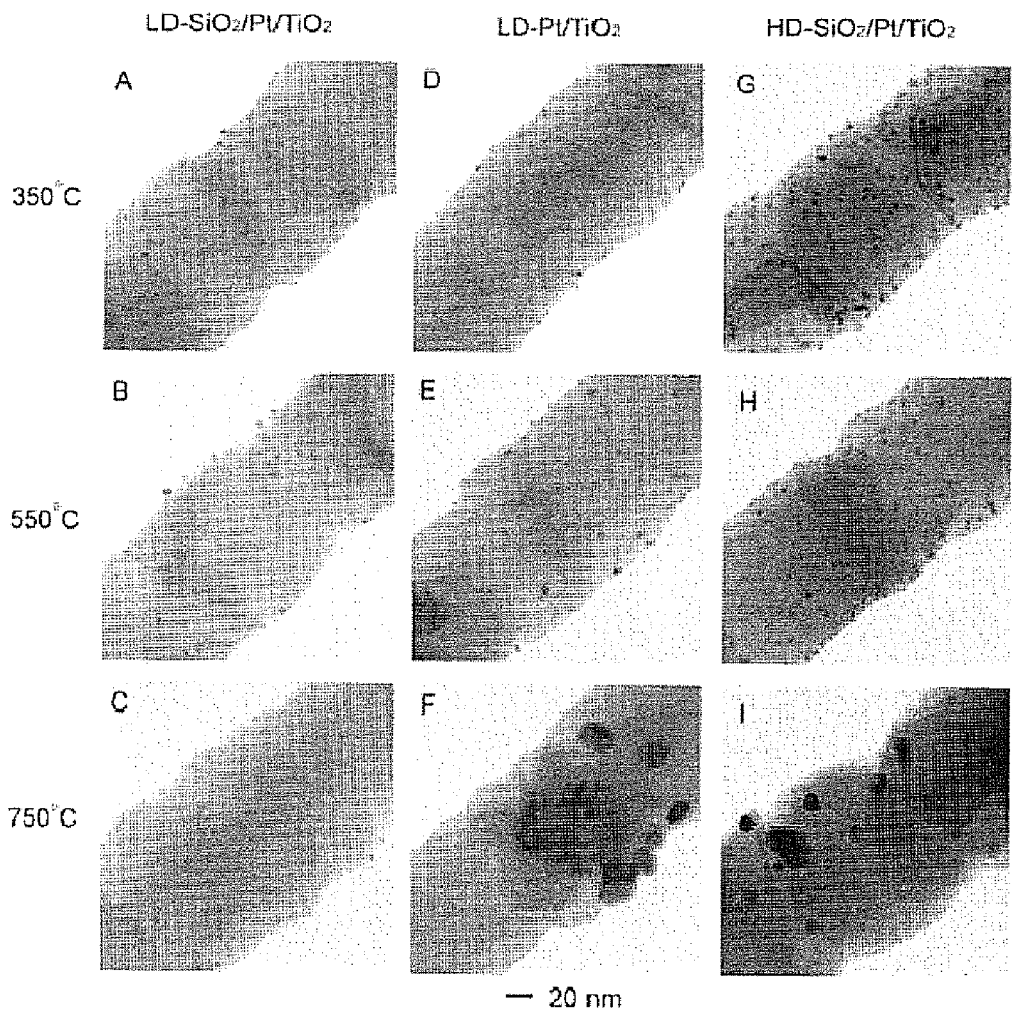
FIGS. 5A-5C are TEM images of low density platinum/titania nanoparticle/nanofiber samples after being coated with a porous silica layer and after being annealed at 350, 550 or 750° C. for 2 hours.
FIGS. 5D-5F are TEM images of low density platinum/titania nanoparticle/nanofiber samples after being annealed 350, 550 or 750° C. for 2 hours.
FIGS. 5G-5I are TEM images of high density platinum/titania nanoparticle/nanofiber samples after being coated with a porous silica layer and after being annealed 350, 550 or 750° C. for 2 hours.

The $SiO_2$-protected Pt nanoparticles were found to be stable at 350° C. and retained their single-crystallinity with an average size of 3.54±0.77 nm (see FIG. 5A). After calcination at 550° C. in air, the $SiO_2$-protected Pt nanoparticles still retained their individual size and morphology well with an average size of 3.46±0.85 nm (see FIG. 5B). And even at a temperature as high as 750° C., $SiO_2$-protected Pt nanoparticles still exhibited high thermal stability with an average size of 3.80±0.94 nm (see FIG. 5C).

For comparison, Pt/$TiO_2$ samples without a silica coating were also thermally treated in at 350, 550 and 750° C. for 2 h. In sharp contrast to the coated specimens, the Pt nanoparticles severely aggregated. For example, FIG. 5D illustrates sintering of the Pt nanoparticles at temperatures as low as 350° C., which was even more distinct at 550° C. showing irregular shapes (see FIG. 5E). At 750° C. the particle density was greatly reduced to form much larger particles with sizes of more than 20 nm (see FIG. 5F). As such, the porous $SiO_2$ coating is advantageous for the thermal stabilization of nanoscale catalysts.

Figure 6:
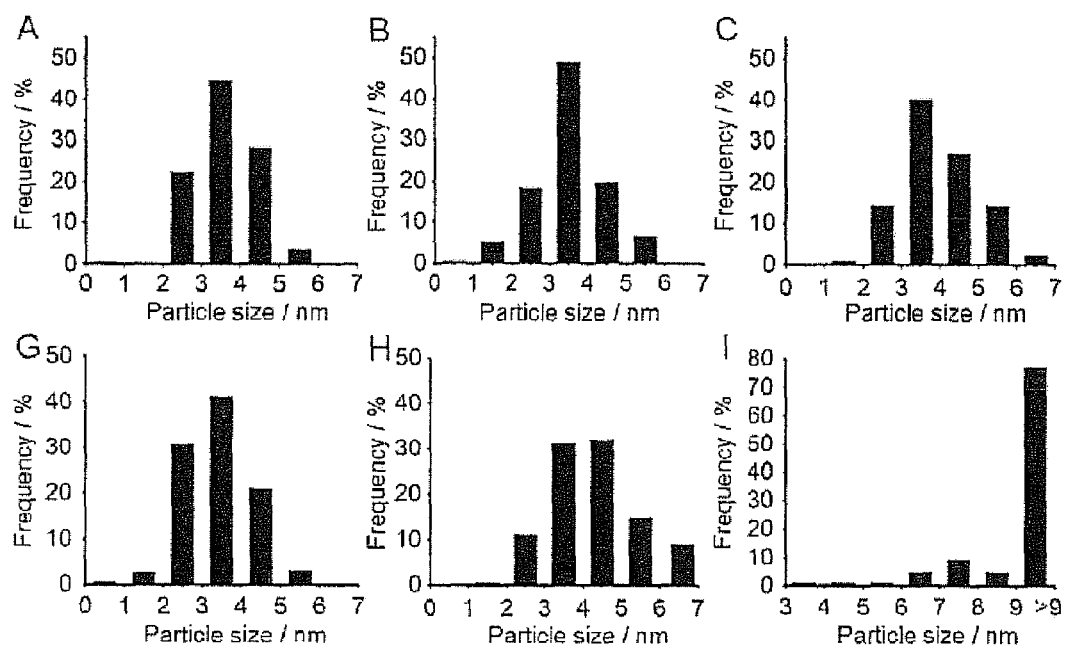
FIGS. 6A-6C are graphs showing the size distribution of platinum nanoparticles for the samples shown in FIGS. 5A-5C.
FIGS. 6G-6I are graphs showing the size distributions of platinum nanoparticles for the samples shown in FIGS. 5G-5I.

Thermal stabilities of HD-$SiO_2$/Pt/$TiO_2$ specimens were also studied. As illustrated in FIGS. 5G-5I, the HD-$SiO_2$/Pt/$TiO_2$ generally good thermal stability only up to 550° C. with significant sintering occurring at 750° C. (compare FIGS. 5H and 5I). The size distributions of both LD-$SiO_2$/Pt/$TiO_2$ and HD-$SiO_2$/Pt/$TiO_2$ after thermal treatment at different temperatures are shown in FIG. 6.

Hydrogenation of methyl red (an azo dye) was chosen as a model system to gain an insight into the catalytic activity of the $SiO_2$/Pt/$TiO_2$ system. Hydrogenation of the N=N azo bond in methyl red breaks the p-conjugation of the molecule and therefore results in a loss of the red color. The hydrogenation reaction is shown schematically in FIG. 7A with FIG. 7B illustrating a plot absorption spectra measured before and after passing the methyl red solution through LD-$SiO_2$/Pt/$TiO_2$ nanofibers calcinated at 350, 550 or 750° C. for 2 h. Significant conversion of the methyl red was afforded by all three samples, indicating that methyl red and hydrogen molecules were able to diffuse through the $SiO_2$ coating to reach the Pt nanoparticles.

The greatest reduction in absorbance occurred for the LD-$SiO_2$/Pt/$TiO_2$ nanofibers calcinated at 350° C. with a conversion of 87%. This conversion slightly decreased to 81% for LD-$SiO_2$/Pt/$TiO_2$ nanofibers calcinated at 550° C. and to 61% for the sample calcinated at 750° C. To verify that the decolorization of the methyl red was a result of the Pt-catalyzed hydrogenation reaction, methyl red was placed in contact with LD-SiO$_2$/Pt/TiO$_2$ nanofibers calcinated at 350° C. for 2 h without the presence of hydrogen. As shown by the curved labeled "350° C. without H$_2$" only a mild decolorization of 11% was observed in the absence of the hydrogen gas. This small value is consistent with data in the literature for methyl red in the absence of any catalyst.

It is appreciated that fibers can be referred to as rods, wires and the like. In addition, although oxide nanofibers and an oxide porous coating have been described in detail, it is also appreciated that nanofibers and porous coatings made from nitrides, sulfides, borides, carbides and the like can fall within the scope of the present invention.

The invention is not restricted to the illustrative examples, embodiments, etc. described above. The examples and/or embodiments are not intended as limitations on the scope of the invention. Methods, apparatus, compositions, and the like described herein are exemplary and not intended as limitations on the scope of the invention. Changes herein and other uses will occur to those skilled in the art. The scope of the invention is defined by the scope of the claims.

We claim:

1. A catalyst material comprising:
    a plurality of fibers;
    a plurality of particles supported on each of said fibers; and
    a porous layer individually covering each of said fibers and said plurality of particles, the porous layer resisting sintering of the particles at elevated temperatures, the porous layer also allowing a fluid to come into contact with the plurality of particles and be catalyzed.

2. The catalyst material of claim 1, wherein said plurality of fibers is a plurality of nanofibers.

3. The catalyst material of claim 2, wherein said plurality of nanofibers are oxide nanofibers.

4. The catalyst material of claim 3, wherein said oxide nanofibers are made from an oxide selected from a group consisting of titanium oxide, aluminum oxide, cerium oxide, tin oxide, silicon oxide and combinations thereof.

5. The catalyst material of claim 4, wherein a density of said plurality of particles supported on said oxide nanofibers is greater than $1.0 \times 10^9$ particles per square millimeter of surface area of said nanofibers.

6. The catalyst material of claim 1, wherein said plurality of particles are a plurality of nanoparticles.

7. The catalyst material of claim 6, wherein said plurality of nanoparticles are a plurality of metal nanoparticles.

8. The catalyst material of claim 7, wherein said plurality of metal nanoparticles contain an element selected from a group consisting of platinum, palladium and rhodium.

9. The catalyst material of claim 1, wherein said porous layer is a porous oxide layer.

10. The catalyst material of claim 9, wherein said porous oxide layer is selected from a group consisting of silicon oxide, aluminum oxide, titanium oxide and combinations thereof.

11. The catalyst material of claim 10, wherein said porous oxide layer coats said plurality of particles and said plurality of fibers.

12. A dual-oxide sinter resistant catalyst comprising:
    a plurality of oxide nanofibers;
    a plurality of metal nanoparticles supported on each of said plurality of nanofibers; and
    a porous oxide layer individually covering each of nanofibers and said plurality of metal nanoparticles, the porous oxide layer resisting sintering of the particles at elevated temperatures, the porous layer also allowing a fluid to come into contact with the plurality of metal nanoparticles and be catalyzed.

13. The dual-oxide sinter resistant catalyst of claim 12, wherein said plurality of oxide nanofibers are made from an oxide selected from a group consisting of titanium oxide, aluminum oxide, cerium oxide, tin oxide, silicon oxide and combinations thereof.

14. The dual-oxide sinter resistant catalyst of claim 12, wherein said plurality of metal nanoparticles contain an element selected from a group consisting of platinum, palladium and rhodium.

15. The dual-oxide sinter resistant catalyst of claim 14, wherein a density of said plurality of metal nanoparticles is between $1.0 \times 10^9$ and $2.5 \times 10^9$ particles per square millimeter of surface area of said nanofiber.

16. The dual-oxide sinter resistant catalyst of claim 12, wherein said porous oxide layer covers said plurality of metal nanoparticles and said plurality of nanofibers.

* * * * *